Aug. 23, 1927.
C. H. PERRY
1,640,249
APPARATUS FOR FILTERING AND PURIFYING LIQUIDS
Filed May 10, 1923
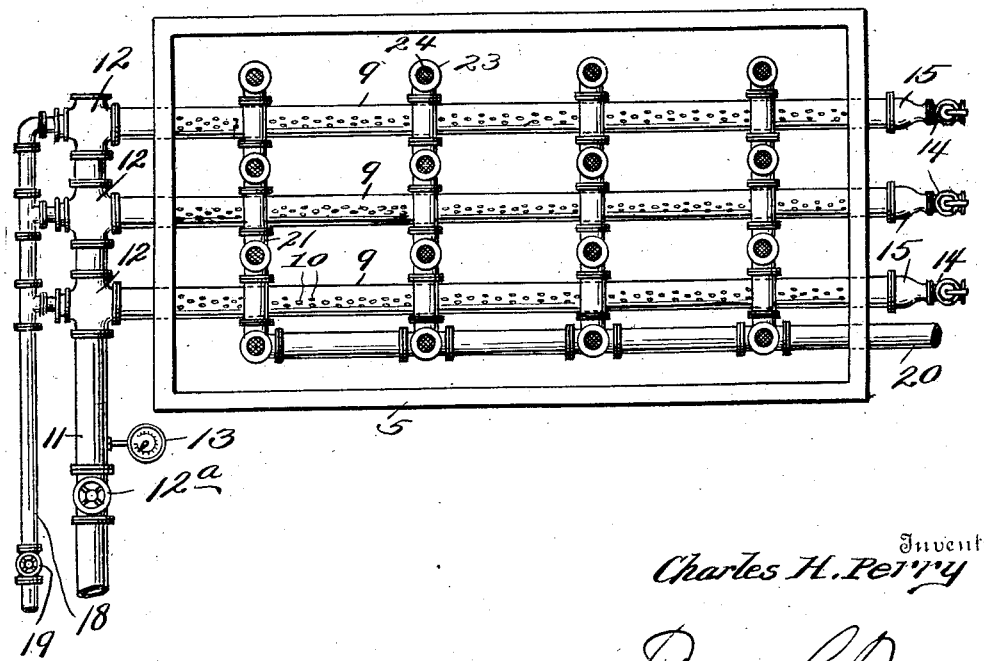
Inventor
Charles H. Perry Patented Aug. 23, 1927.

1,640,249

UNITED STATES PATENT OFFICE.

CHARLES H. PERRY, OF MIAMI, FLORIDA.

APPARATUS FOR FILTERING AND PURIFYING LIQUIDS.

Application filed May 10, 1923. Serial No. 638,015.

This invention relates to an apparatus for filtering and purifying water, and the primary object of the same is to separate particles of matter and impurities suspended in liquids by subsidence of the particles due to the difference in specific gravity between the matter in suspension and the liquid in which it is suspended, and to embody in the method and apparatus settling, filtering, aerating and final purifying steps of procedure involving in the final purifying step a fractional decantation at a materially reduced cost and in less time than is usually required in clarifying liquids and particularly water that is adapted to be used for drinking and other purposes requiring absolute purification. A further object of the invention is to provide an apparatus for filtering water in an upward direction and to subject the water to be treated to air pressure, so that the water entering the filtering tank at the bottom effects a deposit of all the dirt, trash or any other solids on the inside of the supply pipes before the water is acted upon by the main filtering bed, the air under pressure delivered with the water to the supply pipes facilitating the movement of the water upwardly through the filter bed and at the same time aerating the water, with obvious advantages, and so positioning the water that it may be readily finally purified by fractional decantation through additional filtering means held within gathering and conveying devices for carrying the water off from the apparatus.

In the accompanying drawing a preferred form of the apparatus is shown having an open top, but the apparatus will be provided with a covering means, as also illustrated in the drawings, whereby the consumer of the water may be furnished with water under pressure after it has been subjected to the method of filtration and purification hereinafter specified.

In the drawing:

Fig. 1 is a longitudinal section through the apparatus, showing one of the supply branches broken away and in longitudinal section and also illustrating a cover or closure means that may be applied to the top of the apparatus or omitted as desired.

Fig. 2 is a top plan view of the improved apparatus.

The improved filtering apparatus comprises a filtering tank or enclosure 5 of suitable dimensions and material and having therein a filtering bed 6 of suitable filtering material such as sand, gravel, charcoal or other substance adapted for the purpose but preferably composed of gravel. The bed 6 has its upper surface located below the open top 7 of the tank, to leave a reservoir space for the filtered liquid or water. The tank will also be provided with a cover 8 that is intended to close the same and render the tank air-tight, it being proposed to suitably secure this cover in place and introduce air-tight packings at any point desired. Extending longitudinally through the tank 5 and the filtering bed near the bottom of the tank are a series of branch supply pipes 9 having perforations 10 in the top portions thereof, the branch supply pipes 9 projecting suitable distances beyond opposite ends of the tank 5. These pipes have one set of ends thereof connected to a main supply pipe 11 by suitable unions or couplings 12, the main supply pipe 11 having a regulating or cutoff valve 12$^a$ and a pressure gage 13. At their opposite ends each of the branch supply pipes has a blow-off valve 14 connected thereto by a reduced or nozzle coupling 15. During normal filtering operations the blow-off valves 14 are closed but when it is desired to clean the filtering bed 6 and the branch supply pipes 9, all of the blow-off cocks 14 are opened, as will be more fully hereinafter explained. The water entering the supply branches 9 may be easily controlled by the valve 12$^a$ and the pressure of the water ascertained through the gage 13. Extending into each of the supply branch pipes 9 is an air pipe 16 also formed with upper perforations 17, each air pipe being preferably closed at one end adjacent to the blow-off valve connection and at its opposite extremity passing through the union 12 in line therewith and connecting with an air supply pipe 18 having a valve 19. All of the air pipes 16 are connected to the pipe 18, as clearly shown by Fig. 2, and through the latter pipe air under pressure is supplied to the several pipes 16 and the branch supply pipes 9. The introduction of air under pressure into the branch supply pipes 9 facilitates the treatment of the liquid or water by forcing the latter rapidly through the filtering bed 6. In cleaning the apparatus, and at which time the blow-off valves 14 are opened, the air supply pipes also come into play to effectively blow out all sediment, or mud and other matter that may have collected by subsidence in the said branch supply pipes.

Extending into the tank 5 adjacent to one side and also outwardly through the end of the tank adjacent to the blow-off valves 14 is a discharge pipe 20, preferably at a slightly higher elevation than the branch pipes 9, and at intervals auxiliary cross discharge pipes 21 are connected to the pipe 20 by suitable coupling means and have upwardly projecting or vertical pipe branches 22 which serve as primal receivers or decanters for the filtered water, each of the vertical branches 22 terminating above the upper surface of the filtering bed 6 and having an open cap 23 with a wire gauze strainer 24 held therein, and at the point where each vertical branch 22 is connected to its auxiliary cross discharge pipe 21 a perforated plate 25 will be mounted. Between the wire gauze strainers 24 and the perforated plates 25 the vertical branch pipes or decanters 22 will be filled with filtering material 26, which may be charcoal, fine gravel or other suitable substance, for the purpose of subjecting the liquid or water that has been forced through the bed 6 to further purification, so that when the liquid or water passes out through the discharge pipe 20, it will have been fully relieved of all impurities and sediment.

In carrying out the method the liquid or water to be purified is admitted in quantities desired by way of the supply pipe 11 into the branch pipes 9, and at the same time air is admitted to the pipes 6 through the air supply pipe 18, care being first taken to close all of the blow-off valves 14. The liquid or water passing into the branch pipes 9 is primarily relieved of a large part of the sediment, trash or impurities that may be carried thereby by a settlement or subsidence thereof and the liquid or water is forced through the openings 10 by the air acting thereon from the pipe 16, and under air pressure the liquid or water is rapidly forced upwardly through the filtering bed 6 and collects in the reservoir space 7 above the top surface of the said filtering bed. If it is not desired to have the water discharged through the pipe 20 under pressure, the cover 8 may be removed and the liquid or water collecting in the reservoir space 7 will then pass downwardly through the vertical branch pipes 22 and be acted upon by the filtering material 26 and finally gather in and be discharged through the pipe 20. If it is desired to have the water delivered to a consumer under pressure, the cover 8 is tightly secured on the tank 5 and the pressure gathering in the reservoir space 7 with the liquid or water passed through the bed 8 will act upon this water and force the same downwardly through the vertical branch pipes 22 and out through the discharge pipe 20 with considerable pressure. At any time desired the quantity of water entering the branch pipes 9 may be modified and the air admitted to the pipe 16 from the pipe 18 may be regulated in more or less quantities as found necessary. There is no filtering material in the horizontally disposed cross pipes 21, so that the water discharged into these pipes from the vertical branch pipes 22 will be free to flow into and outwardly through the pipe 20. The air passing through the filtering bed 6 with the water beneficially acts to thoroughly aerate the water. The method of filtering the water in an upward direction is superior to a downward movement of water through a filtering bed, for the reason that the supply through the pipe 11 can be more readily controlled through the medium of the valve 12 and the speed of filtering regulated to the best advantage, and this upward movement of the water together with the air passing upwardly through the filtering bed with the water is materially advantageous, as will be readily understood, and the filtration and purification of the liquid or water so treated will be less expensive as compared with downward filtering methods, and the liquid or water will be more thoroughly and in fact completely relieved of all sediment and impurities. Furthermore, by filtering in an upward direction from the lower portion of the filtering bed, the greater part of the dirt, trash and other solids are left inside of the branch pipes 9 and in the lower part of the filtering bed instead of on top of the latter as in those filters where the water moves downwardly through the filtering bed.

In cleaning the improved filter the valve 12ª is closed and the blow-off valves 14 opened, and immediately the filtered water held above the bed 6 filters back into the supply pipes and out through the blow-off valves, to thereby produce a complete backwash with filtered water, and if any dirt should remain in the branch supply pipes 9, the water can be turned on through the pipe 11 by opening the valve 12 and these branch supply pipes thereby thoroughly washed out. After this operation it is only necessary to close the blow-off valves 14 to put the apparatus in condition for again carrying on the method of filtration and purification therein. If it should happen that the water that is filtered and gathered in the reservoir space 7 is very cloudy and still contains a great deal of mud, the blow-off valves 14 may be opened slightly and allow the heavier substance to pass off from the pipes 9 at the same time that the water is passing upwardly through the filtering bed 6.

It will be understood that both water and air may be supplied from any source, and also that various filtering materials may be used in accordance with the character of the liquid or water to be filtered and purified.

What is claimed as new is:

1. A filtering apparatus comprising an enclosure having a filtering bed closely engaging the side walls thereof and a reservoir space above the upper surface of the filtering bed, liquid supply pipes extending into the enclosure at the base of the filtering bed, air pipes extending into the supply pipes and longitudinally with relation to the latter, the supply pipes and air pipes having upper perforations for forcing the liquid under air pressure upwardly through the filtering bed into the reservoir space above the latter, and a discharge pipe at the lower portion of the bed having cross branches with vertically extending tubular receivers terminating above the upper surface of the filtering bed and provided with upper open ends and imperforate side walls, each of the receivers also having filtering material therein.

2. A filtering apparatus comprising an enclosure with a filtering bed closely engaging the walls thereof and having its top portion below the top of the enclosure to form a reservoir space for holding partially purified liquid above the said bed, liquid supply pipes extending into the lower portion of the enclosure at the base of the filtering bed and formed with upper openings, air pipes extending into and lengthwise of the supply pipes and also having openings at their upper portions for the egress of air under pressure into the supply pipes for engagement with the liquid to be purified for the purpose of forcing the said liquid upwardly through the filtering bed, and a discharge pipe for the finally purified liquid having a plurality of vertically disposed decanting tubes connected thereto, the said tubes having upper open ends above the top surface of the filtering bed and also provided with imperforate side walls, said tubes also having charges of granular filtering material held therein above the discharge pipe.

3. A filtering apparatus comprising an enclosure having a filtering bed therein and an upper reservoir space above the top of the bed for partially purified liquid, means for delivering liquid to be purified under pressure at the base of and directly to and fully along the filtering bed within the enclosure, and a conduit having a series of vertically disposed separated decanting tubes with imperforate side walls extending upwardly through the bed and having upper open ends terminating above the top surface of the filtering bed in said reservoir space, the said decanting tubes above the conduit being filled with filtering material.

4. A filtering apparatus comprising an enclosure with a filtering bed therein and a reservoir space above the top surface of the said bed, a valved liquid supply pipe having branches extending into the enclosure at the base of the filtering bed and outwardly beyond the enclosure at their opposite extremities, the latter extremities having blow-off valves, air pipes extending into the supply branches for delivering air under pressure within said branches, the branches and air pipes having upper apertured portions, and a discharge pipe having cross branches with vertical receiving and decanting tubes terminating above the upper surface of the filtering bed and provided with charges of filtering material.

In testimony whereof I have hereunto set my hand.

CHARLES H. PERRY.